United States Patent [19]

Shen et al.

[11] 3,882,239

[45] May 6, 1975

[54] METHOD OF TREATING PAIN FEVER AND INFLAMMATION AND COMPOSITION

[75] Inventors: Tsung-Ying Shen, Westfield; Howard Jones, Holmdel; Michael W. Fordice, Cranford, all of N.J.

[73] Assignee: Merck & Co., Inc., Rahway, N.J.

[22] Filed: June 13, 1974

[21] Appl. No.: 479,014

Related U.S. Application Data

[63] Continuation of Ser. No. 286,798, Sept. 6, 1972, abandoned, which is a continuation-in-part of Ser. No. 108,629, Jan. 21, 1971, abandoned.

[52] U.S. Cl. ............ 424/303; 260/607 A; 424/250; 424/270; 424/273; 424/275; 424/285
[51] Int. Cl............................................ A61k 27/00
[58] Field of Search.................. 424/303; 260/607 A

[56] References Cited

UNITED STATES PATENTS

| | | | |
|---|---|---|---|
| 3,312,730 | 4/1967 | Winter et al...................... | 260/473 |
| 3,654,349 | 4/1972 | Shen et al......................... | 260/473 |

*Primary Examiner*—Stanley J. Friedman
*Attorney, Agent, or Firm*—Mario A. Monaco; Harry E. Westlake, Jr.

[57] ABSTRACT

New substituted indene alcohols and ethers. The substituted indenes disclosed herein have anti-inflammatory, anti-pyretic and analgesic activity. Also included herein are methods of preparing said indenes, pharmaceutical compositions having said indenes as an active ingredient and methods of treating inflammation by administering these particular compositions to patients.

2 Claims, No Drawings

METHOD OF TREATING PAIN FEVER AND INFLAMMATION AND COMPOSITION

RELATED CASES

This application is a continuation of U.S. Ser. No. 286,798, filed Sept. 6, 1972, which is now abandoned, which is a continuation-in-part of U.S. Ser. No. 108,629, filed Jan. 21, 1971, which is also abandoned.

SUMMARY OF THE INVENTION

This invention relates to new 1-aralkylene (or heteroalkylene) 3-indenyl aliphatic alcohols and ethers, and to a process for their preparation. The invention is also related to the use of said compounds and others in pharmaceutical compositions and to methods of treating pain, fever or inflammation by administering these particular compounds to patients.

More specifically, this invention relates to compounds having the following general formula:

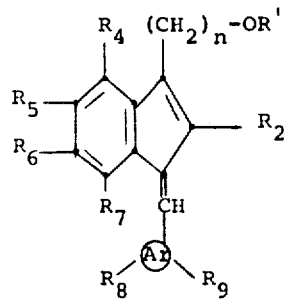

(I)

wherein $R_2$ is hydrogen, alkyl, haloalkyl, alkenyl, or alkynyl; $n$ may be 1 or 2 and $R'$ may be hydrogen, carboxylic acyl or alkyl;

$R_4$, $R_5$, $R_6$ and $R_7$ each may be hydrogen, alkyl, acyloxy, alkenyloxy, alkoxy, nitro, amino, acylamino, alkylamino, dialkylamino, dialkylaminoalkyl, sulfamyl, alkylthio, mercapto, hydroxy, hydroxyalkyl, alkylsulfonyl, halogen, cyano, carboxyl, carboalkoxy, carbamido, haloalkyl, cycloalkyl, cycloalkoxy, alkenyl, alkynyl, trifluoromethyl or alkylsulfinyl;

(Ar) is aryl or heteroaryl;

$R_8$ is hydrogen, alkylsulfinyl, alkylsulfonyl or alkylthio;

When $R'$ is other than hydrogen, $R_9$ is hydrogen, halogen, hydroxy, alkoxy, hydroxyalkoxy, haloalkoxy, or haloalkyl;

and when $R'$ is hydrogen; $R_9$ is haloalkyl, hydroxyalkoxy or haloalkoxy.

The more preferred compounds of this invention are those wherein:

$R_2$ is hydrogen, $C_{1-5}$ loweralkyl, (chloro, bromo or fluoro), $C_{1-5}$ lower alkyl, $C_{2-5}$ lower alkenyl or $C_{2-5}$ loweralkynyl;

$R'$ is hydrogen, $C_{1-5}$ loweralkanoyl or $C_{1-5}$ loweralkyl;

$n$ is 1 or 2;

$R_4$, $R_5$, $R_6$ and $R_7$ are each hydrogen, $C_{1-5}$ loweralkyl, $C_{2-5}$ lower alkenyloxy, $C_{1-5}$ loweralkanoyloxy, $C_{1-5}$ lower alkoxy, nitro, amino, $C_{1-5}$ alkanoylamino, $C_{1-5}$ lower alkylamino, $C_{1-5}$ diloweralkylamino, $C_{1-5}$ diloweralkylamino-$C_{1-5}$ lower-alkyl, sulfamyl, $C_{1-5}$ loweralkylthio, mercapto, hydroxy, hydroxy $C_{1-5}$ loweralkyl, $C_{1-5}$ loweralkylsulfonyl, halo, cyano, carboxyl, carb-$C_{1-5}$ loweralkoxy, carbamido, (chloro, bromo, fluoro)-$C_{1-5}$ loweralkyl, cyclohexyl, cyclopentyl, cyclohexyloxy, cyclopenyloxy, $C_{2-5}$ lower alkenyl, $C_{2-5}$ loweralkynyl, trifluoromethyl or $C_{1-}$ loweralkylsulfinyl;

$R_8$ is hydrogen, $C_{1-5}$ loweralkylsulfinyl, $C_{1-5}$ lower alkyl sulfonyl or $C_{1-5}$ loweralkylthio;

when $R'$ is other than hydrogen, $R_9$ is hydrogen, chloro bromo, fluoro, hydroxy, $C_{1-5}$ loweralkoxy, $C_{1-5}$ hydroxyalkoxy, $C_{1-5}$ haloalkoxy or (chloro, bromo or fluoro)-$C_{1-5}$ loweralkyl; and when $R'$ is hydrogen, $R_9$ is (chloro, bromo or fluoro) $C_{1-5}$ loweralkyl;

(Ar) is the residue of benzene, naphthalene, biphenyl pyrrole, furan, thiophene, pyridene, imidazole, pyrazine or thiazole.

In the most preferred compounds of this invention, $R_2$ is hydrogen or $C_{1-5}$ loweralkyl;

$R'$ is hydrogen or $C_{1-5}$ loweralkyl;

$R_4$ is hydrogen;

$R_6$ and $R_7$ are each hydrogen or halogen;

$R_5$ is hydrogen, halo, $C_{1-5}$ loweralkyl, $C_{2-5}$ lower alkenyloxy, or $C_{1-5}$ loweralkoxy;

(Ar) is phenyl;

$R_8$ is hydrogen, $C_{1-5}$ loweralkylsulfinyl, $C_{1-5}$ loweralkylthio or $C_{1-5}$ loweralkylsulfonyl;

when $R'$ is other than hydrogen, $R_9$ is hydrogen, $C_{1-}$ lower-alkyl, $C_{1-5}$ lower alkoxy, hydroxy, β-hydroxyethoxy, β-chloromethoxy or halogen; and when $R'$ is hydrogen, $R_9$ is $C_{1-5}$ (chloro, bromo or fluoro)-loweralkyl, β-hydroxyethoxy or β-chloroethoxy.

In a more particular aspect, the invention is also related to a method of treating pain, fever and inflammation and to compositions employing compounds of the formula:

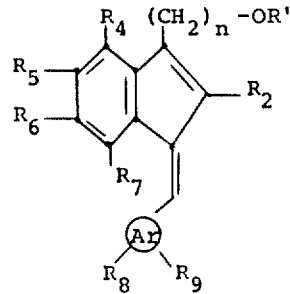

wherein $R_2$ is hydrogen, alkyl, haloalkyl, alkenyl, or alkynyl;

$n$ may be 1 or 2;

$R'$ may be hydrogen, carboxylic acyl or alkyl;

$R_4$, $R_5$, $R_6$ and $R_7$ each may be hydrogen, alkyl, acyloxy alkenyloxy, alkoxy, nitro, amino, acylamino, alkylamino, dialkylamino, dialkylaminoalkyl, sulfamyl alkylthio, mercapto, hydroxy, hydroxyalkyl, alkylsulfonyl, halogen, cyano, carboxyl, carboalkoxy, carbamido, haloalkyl, cycloalkyl, cycloalkoxy, alkenyl alkynyl, trifluoromethyl or alkylsulfinyl;

(Ar) is aryl or heteroaryl;

$R_8$ is hydrogen alkylsulfinyl, alkylsulfonyl or alkylthio $R_9$ is hydrogen, halogen, hydroxy, alkoxy, hydroxyalkoxy, haloalkoxy or haloalkyl.

The preferred compounds employed in the method of treatment and composition aspect of the invention are those wherein $R_2$ is hydrogen, $C_{1-5}$ loweralkyl, (chloro, bromo or fluoro)-$C_{1-5}$ loweralkyl, $C_{2-5}$ lower alkenyl or $C_{2-5}$ loweralkynyl;

R' is hydrogen, $C_{1-5}$ loweralkanoyl or $C_{1-5}$ loweralkyl;

$n$ is 1 or 2;

$R_4$, $R_5$, $R_6$ and $R_7$ are each hydrogen, $C_{1-5}$ loweralkyl, $C_{2-5}$ lower alkenyloxy, $C_{1-5}$ loweralkanoyloxy, $C_{1-5}$ lower alkoxy, nitro, amino, $C_{1-5}$ alkanoylamino, $C_{1-5}$ lower alkylamino, $C_{1-5}$ diloweralkylamino, $C_{1-5}$ diloweralkylamino- $C_{1-5}$ loweralkyl, sulfamyl, $C_{1-5}$ loweralkylthio, mercapto, hydroxy, hydroxy $C_{1-5}$ loweralkyl, $C_{1-5}$ loweralkylsulfinyl, halo, cyano, carboxyl, carb-$C_{1-5}$ loweralkoxy, carbamido, (chloro, bromo, fluoro) $C_{1-5}$ loweralkyl, cyclohexyl, cyclopentyl, cyclohexyloxy, cyclopenyloxy, $C_{2-5}$ loweralkynyl, trifluoromethyl or $C_{1-5}$ loweralkylsulfonyl;

$R_8$ is hydrogen, $C_{1-5}$ loweralkylsulfinyl, $C_{1-5}$ loweralkylsulfonyl or $C_{1-5}$ loweralkylthio;

(Ar) is the residue of benzene, naphthalene, biphenyl, pyrrole, furan, thiophene, pyridine, imidazole, pyrazine or thiazole; and the most preferred compounds are those wherein $R_2$ is hydrogen or $C_{1-5}$ loweralkyl;

R' is hydrogen or $C_{1-5}$ loweralkyl;

$R_4$ is hydrogen;

$R_6$ and $R_7$ are each hydrogen or halogen;

$R_5$ is hydrogen, halo, $C_{1-5}$ loweralkyl, $C_{2-5}$ loweralkenyloxy, or $C_{1-5}$ loweralkoxy;

(Ar) is phenyl;

$R_8$ is hydrogen, $C_{1-5}$ loweralkylsulfinyl, $C_{1-5}$ loweralkylthio or $C_{1-5}$ loweralkylsulfonyl.

Further in an especially preferred aspect of this invention we have found a method of treating pain, fever and inflammation by using 5-fluoro-2-methyl-1-(p-methylsulfinylbenzylidenyl)-3-indenyl-β-ethanol as the active component, as hereafter further described.

Some of the above compounds are related to those disclosed in U.S. Pat. No. 3,642,785, issued Feb. 15, 1972 (filed Aug. 11, 1969). The compounds however, are disclosed as intermediates for preparing 3-indenylamines. We have found that these compounds surprisingly have pharmaceutical properties as the other compounds of this invention and are administered in the same manner and dosage as described hereinbelow for the compounds of this invention. This discovery makes up another part of this invention, particularly with regard to the use of 5-fluoro-2-methyl-1-(p-methylsulfinylbenzylidenyl)-3-indenyl-β-ethanol as a pharmaceutically active compound.

Representative compounds of this invention are as follows:

5-Fluoro-3-(2'-methoxyethyl)-1-(p-methylsulfinylbenzylidene)-indene

5-Fluoro-3-methoxymethyl-1-(p-methylsulfinylbenzylidene)-indene and the corresponding pharmaceutically acceptable salts.

It should be noted that the compounds of this invention may be isomerized into their cis and trans isomers by procedures well known in the art. It should be further noted that the cis isomer of the compounds of this invention is substantially more active than the trans isomer. Accordingly, it is to be understood that reference throughout the specification and appended claims to the compounds of this invention is intended to encompass not merely the compounds per se but includes their geometric isomers (cis, trans).

It should be further noted by one skilled in the art that the alkylsulfinyl derivatives of this invention are racemic mixtures of optically active enantiomorphs which may be resolved into their (+) and (−) forms by techniques well known in the art.

One skilled in the art should further note that some of the compounds of this invention are polymorphic and have different crystalline structures, melting points and solubility characteristics.

The compounds of the instant invention can be used to treat inflammation by reducing inflammation and relieving pain in such diseases as rheumatoid arthritis, osteoarthritis, gout, infectious arthritis and rheumatic fever.

The compounds of Formula I and II also have antipyretic and analgesic activity and would be administered and used in the same manner and in the same dosage ranges as if they were being used to treat inflammation as discussed further on.

The treatment of inflammation in accordance with the method of the present invention is accomplished by topically, orally, rectally or parenterally administering to patients a composition of a compound of Formula II, particularly the especially preferred compounds in a non-toxic pharmaceutically acceptable carrier.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, cab-o-sil, and acacia. Exemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup, an aqueous solution or a liquid suspension. Suppositories may be prepared in a conventional manner by mixing the compounds of this invention with a suitable non-irritating excipient which is solid at room temperature, but liquid at the rectal temperature. Such materials are cocoa butter and polyethylene glycol. Gels and lotions for topical application may be prepared in conventional manners.

The compounds of Formula I and II and of the compositions of this invention are administered in an amount sufficient to treat inflammation, that is to reduce inflammation. Advantageously, the compositions will contain the active ingredient, namely, the compounds of Formula II in an amount of from about 0.1 to 50 mg. per kg. body weight per day (5 mg. to 3.5 g. per patient per day), preferably from about 1 to 15 mg./kg. body weight per day (50 mg. to 1 g. per patient per day).

The method of treatment of this invention comprises administering to a patient (animal or human) a compound of Formula II, particularly an especially preferred compound admixed with a non-toxic pharmaceutical carrier such as exemplified above. The compounds of Formual II and particularly the especially preferred compounds will be administered in an amount of from 0.1 to 50 mg./kg. body weight per day, preferably from about 1 to about 15 mg. per kilogram body weight per day. The most rapid and effective antiinflammatory effect is obtained from oral administration of a daily dosage of from about 1 to 15 mg./kg. per day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly those of Formula II, for example, age, body weight, sex, diet, time of administration, route of administration, rate of excretion, drug combination, reaction sensitivities and severity of the particular disease.

In the preparation of the compounds of this invention, the starting material is a substituted indenyl ester or acid. The corresponding alcohol is formed and the desired substituent is introduced in the 1- position. The desired [(Ar)] substituent may then be introduced in a conventional manner. More particularly a 3-indenyl acetic acid or preferably alkyl ester is reduced to the corresponding alcohol by well known means such as with lithium aluminumhydride or sodium borohydride, followed by condensation of the appropriate aldehyde in the 1- position of the indene moiety. The ether derivatives may be then prepared by reaction of the alcohol with an appropriate organic halide. Alternatively, the ether may be prepared prior to condensation and subsequently reaction with the appropriate aldehyde.

The following examples are presented to further illustrate the invention:

EXAMPLE 1

A. 5-Fluoro-2-methyl-3-indenyl-β-ethanol

To a suspension of lithium aluminum hydride (1.0 g., 0.264 mole) in ether (50 ml.) is added methyl-5-fluoro-2-methyl-3-indenylacetate (9.8 g., 0.0446 mole) in ether (75 ml.) over 30 minutes. The mixture is heated at reflux for 3 hours, cooled to 0°–5° and methanol (50 ml.) added. Water (50 ml.) is added slowly. Magnesium sulfate (10 g.) is added, and the mixture is filtered through diatomaceous earth. The filtrate is dried ($MgSO_4$) and concentrated to an oil. The oil is taken up in benzene and chromatographed on silica gel. After elution of some starting material and a mixed fraction, 5-fluoro-2-methyl-3-indenyl-β-ethanol is obtained.

Similarly when an equivalent amount of
methyl-2-methyl-5-methoxy-3-indenylacetate
ethyl-2-methyl-5-allyloxy-3-indenylacetate
methyl-2-methyl-5,7-difluoro-3-indenylacetate
methyl-2-methyl-5-nitro-3-indenylacetate
methyl-2-methyl-5-amino-3-indenylacetate
methyl-2-methyl-5-hydroxy-3-indenylacetate
methyl-2-methyl-5-dimethylamine-3-indenylacetate
is used in place of methyl-5-fluoro-2-methyl-3-indenylacetate in 1A above, there is obtained the corresponding substituted-3-indenyl-β-ethanol.

B. cis- and trans-5-Fluoro-2-methyl-1-(p-methylsulfinylbenzylidene)-3-indenyl-β-ethanol To a solution of 5-fluoro-2-methyl-3-indenyl-β-ethanol from Example 1A (3.84 g., 0.020 mole) in methanol (60 ml.) is added sodium methoxide (2.16 g., 0.04 mole) and after solution p-methylsulfinylbenzaldehyde (3.26 g., 0.02 mole). The mixture is heated at reflux for 5 hours, cooled, poured into ether-water, extracted with ether, dried ($MgSO_4$), and concentrated to an oil in vacuo. The oil is taken up in methylene chloride and chromatographed on silica gel and eluted with ethyl acetate. The fractions of eluate are concentrated to yield cis- and trans-5-fluoro-2-methyl-1-(p-methylsulfinylbenzylidene)-3-indenyl-β-ethanol.

Similarly when an equivalent amount of p-chloromethylbenzaldehyde, p-methylsulfonylbenzaldehyde, p-methylthiobenzaldehyde, o-methylbenzaldehyde, pyrazine aldehyde, pyrrol 2-aldehyde, furfural, pyrimidine-2-aldehyde, benzothiazole-2-aldehyde, thiophene-2-aldehyde, thiazole-2-aldehyde, oxazole-4-aldehyde or benzoxazole-2-aldehyde is used in place of p-methylsulfinylbenzaldehyde in 1B above, there is obtained the corresponding 1-substituted-3-indenylethanol. Similarly when an equivalent amount of the substituted-3-indenyl-ethanols obtained from 1A are used in place of 5-fluoro-2-methyl-3-indenyl ethanol in 1B above, there is obtained the corresponding 1-(p-methylsulfinylbenzylidenyl)-substituted-3-indenyl-β-ethanols.

C. cis-5-Fluoro-3-(2'-methoxyethyl)-2-methyl-1-(p-methylsulfinylbenzylidene)-indene To cis-5-fluoro-2-methyl-1-(p-methylsulfinylbenzylidene)-3-indenyl-β-ethanol from Example 1-B (0.400 g., 0.0017 mole) in dimethoxyethane (10 ml.) is added oil-free sodium hydride (0.048 g., 0.002 mole) and the mixture is stirred at 25° for 1 hour. To the mixture is added methyl iodide (2.28 g., 0.016 mole) and stirring at 25° is continued for 18 hours. The mixture is poured into methylene chloride-water, extracted with methylene chloride, the methylene chloride extract washed with water, dried ($MgSO_4$), and concentrated. The concentrate is chromatographed over silica gel and the eluate concentrated to yield cis-5-fluoro-3-(2'-methoxyethyl)-2-methyl-1-(p-methylsulfinylbenzylidene)-indene.

Similarly when an equivalent amount of ethyl iodide or acetyl iodide is used in place of methyl iodide in 1C above, there is obtained the corresponding ethyl or acetyl compound.

Similarly when an equivalent amount of the 1-substituted-3-indenyl ethanols or 1-(p-methylsulfinylbenzylidenyl)-substituted-3-indenyl-β-ethanols obtained from 1B is used in place of 5-fluoro-2-methyl-1-(p-methylsulfinylbenzylidenyl)-3-indenyl-β-ethanol in 1C above there is obtained the corresponding 3-methoxyethyl compound.

In the above way also, using the following starting materials other indene ethanols are prepared.

| STARTING MATERIAL | PRODUCT |
| --- | --- |
| methyl 5,6-difluoro-2-methyl-3-indenyl acetate | cis,5,6-difluoro-3-(2'-methoxyethyl)-2-methyl-1-(p-methylsulfinylbenzylidene)-indene |

−Continued

| STARTING MATERIAL | PRODUCT |
| --- | --- |
| methyl 5-cyano-2-methyl-3-indenyl acetate | cis-5-cyano-3-(2'-methoxyethyl)-2-methyl-1-(p-methylsulfinylbenzylidene)-indene |
| methyl 5-dimethylamino-2-methyl-3-indenyl acetate | cis-5-dimethylamino-3-(2'-methoxyethyl)-2-methyl-1-(p-methylsulfinylbenzylidene)-indene |
| methyl 5-allyloxy-2-methyl-3-indenyl acetate | cis-5-allyloxy-3-(2'-methoxyethyl)-2-methyl-1-(p-methylsulfinylbenzylidene)-indene |
| methyl 5-methoxy-6-fluoro-2-methyl-3-indenyl acetate | cis-5-methoxy-6-fluoro-3-(2'-methoxyethyl)-2-methyl-1-(p-methylsulfinylbenzylidene)-indene |

EXAMPLE 2

A. Methyl 5-Fluoro-2-methyl-3-indenylformate

A mixture of 6-fluoro-2-methyl-1-indanone (49.2 g., 0.30 mole), "activated" zinc dust (25.4 g., 0.40 mole) ethyl chloroformate (32.6 g., 0.3 mole) and a crystal of iodine in dry benzene (1.5 liters) is refluxed for 5 hours. The mixture is poured into sulfuric acid (5%, 1.5 liters) and extracted with ether, the ether extract dried (MgSO₄), and the ethereal solution concentrated. The crude ester is redissolved in benzene (440 ml.), phosphorous pentoxide (88 g.) added, and the resulting mixture refluxed for 30 minutes. The mixture is decanted, the residue washed with benzene, the benzene layers are combined, washed with water, saturated salt solution and dried (MgSO₄). The benzene solution is concentrated in vacuo and the residue recrystallized from ethyl acetate-n-hexane to obtain methyl 5-fluoro-2-methyl-indenylformate.

B. 5-Fluoro-3-hydroxymethyl-2-methylindene

Methyl 5-fluoro-2-methylindenylformate (41.2 g., 0.2 mole) by the method of Example 1A is converted to the subject compound.

C. cis- and trans-5-Fluoro-3-hydroxymethyl-2-methyl-1-(p-methylsulfinylbenzylidene)-indene 5-Fluoro-3-hydroxymethyl-2-methylindene (17.8 g., 0.1 mole) by the method of Example 1B is converted to the subject compound.

Similarly, when an equivalent amount of the aldehyde compounds of Example 1 is used in place of p-methylsulfinylbenzaldehyde in 2C above, there is obtained the corresponding 1-substituted-3-hydroxymethylindene compound.

D. cis-5-Fluoro-3-methoxymethyl-2-methyl-1-(p-methylsulfinylbenzylidene)-indene cis-5-Fluoro-3-hydroxymethyl-2-methyl-1-(p-methylsulfinylbenzylidene)-indene (3.28 g., 0.01 mole) by the method of Example 1-C is converted to the subject compound.

In a similar way to that described above the following products are prepared.

| STARTING MATERIAL | PRODUCT |
| --- | --- |
| 5,6-difluoro-2-methyl-1-indanone | cis-5,6-difluoro-3-methoxymethyl-2-methyl-1-(p-methylsulfinylbenzylidene)-indene |
| 6-cyano-2-methyl-1-indanone | cis-5-cyano-3-methoxymethyl-2-methyl-1-(p-methylsulfinylbenzylidene)-indene |
| 6-dimethylamino-2-methyl-1-indanone | cis-5-dimethylamino-3-methoxymethyl-2-methyl-1-(p-methylsulfinylbenzylidene)-indene |
| 6-allyloxy-2-methyl-1-indanone | cis-5-allyloxy-3-methoxymethyl-2-methyl-1-(p-methylsulfinylbenzylidene)-indene |
| 5-fluoro-6-methoxy-2-methyl-1-indanone | cis-5-methoxy-6-fluoro-3-methoxymethyl-2-methyl-1-(p-methylsulfinylbenzylidene)-indene |

EXAMPLE 3

A. o-Chlorothioanisole

With cooling and stirring o-methylthioaniline (104.4 g., 0.75 mole) is added to 40–60% sulfuric acid (333 ml.). When the temperature falls to 5°, sodium nitrite (51.2 g., 0.8 mole) in water (65 ml.) is added at a rate to keep the temperature below 7°. The diazotization is stopped when a positive test for free nitrous acid is obtained. A freshly prepared solution of cuprous chloride (50.0 g., 0.8 mole) in concentrated hydrochloric acid (140 ml.) is added at 0° with vigorous stirring. The solution is allowed to warm to room temperature, then to 60°. The oily o-chlorothioanisole is extracted with benzene (3 × 200 ml.), the benzene layer washed with 2.5 N sodium hydroxide solution, then water, and dried (MgSO₄). The benzene is distilled, followed by distillation of the product, o-chlorothioanisole.

Using the same reaction conditions and techniques, when o-methylthioaniline is reacted with cuprous bromide and cuprous cyanide, there is obtained o-bromothioanisole and o-cyanothioanisole, respectively.

B. 3-Chloro-4-methylsulfinylbenzaldehyde o-Chlorothioanisole (0.35 mole) in methylene chloride (200 ml.) is added to anhydrous aluminum chloride (66.67 g., 0.5 mole). The mixture is stirred and cooled while dichloromethyl methyl ether is added dropwise. After the solution is completed, the mixture is stirred for 15 minutes at room temperature. The liquid phase is decanted into ice and water (300 g.) and the unreacted aluminum chloride is washed with methylene chloride until the washes are colorless. The washes and decanted material are combined. The layers are separated and the organic layer is washed with saturated potassium carbonate, dried (MgSO₄), and distilled to yield 3-chloro-4-methylthiobenzaldehyde, which is treated with sodium metaperiodate trihydrate to form 3-chloro-4-methylsulfinylbenzaldehyde.

C. cis- and trans-5-Fluoro-2-methyl-1-(3'-chloro-4'-methylsulfinylbenzylidene)-3-indenyl-β-ethanol To a solution of 5-fluoro-2-methyl-3-indenyl-β-ethanol from Example 1A (3.84 g., 0.020 mole) in methanol (60 ml.) is added sodium methoxide (2.16 g., 0.04 mole) and after solution 3-chloro-4-methylsulfinylbenzaldehyde (0.02 mole). The mixture is heated at reflux for 5 hours, cooled, poured into ether-water, extracted with ether, dried (MgSO₄), and concentrated to an oil in vacuo. The oil is taken up in methylene chloride and chromatographed on silica gel and eluted with ethyl acetate. The fractions of eluate are concentrated to yield cis- and trans-5-fluoro-2-methyl-1(3'-chloro-4'-methylsulfinylbenzylidene)-3-indenyl-β-ethanol.

EXAMPLE 4

A. 5-Fluoro-2-methyl-3(2'-methoxyethyl)-indene

To 5-fluoro-2-methyl-indenyl-3-β-ethanol from Example 1A (0.0017 mole) in dimethoxyethane (10 ml.) is added oil-free sodium hydride (0.048 g., 0.002 mole) and the mixture is stirred at 25° for 1 hour. To the mixture is added methyl iodide (2.28 g., 0.016 mole) and stirring at 25° is continued for 18 hours. The mixture is poured into methylene chloride-water, extracted with methylene chloride, the methylene chloride extract washed with water, dried (MgSO₄), and concentrated. The concentrate is chromatographed over silica gel and the eluate concentrated to yield 5-fluoro-2-methyl-3(2'-methoxyethyl)-indene.

B. cis-5-Fluoro-3-(2''-methoxyethyl)-1-(3'-chloro-4'-methylsulfinylbenzylidene)-indene A solution of Example 4A is condensed with 3-chloro-4-methylsulfinylbenzaldehyde (of Example 3B) using the procedure of Example 3C to yield the subject compound.

EXAMPLE 5

A. o-(β-Hydroxyethoxy-thioanisole o-Hydroxythioanisole (14.1 g., 0.1 mole) is dissolved in sodium ethoxide (6.8 g., 0.1 mole) in absolute ethanol (100 ml.) and stirred as β-hydroxyethylchloride (8.1 g., 0.1 mole) is added. The reaction mixture is refluxed for 2 hours and cooled. The o-(β-hydroxyethoxy)-thioanisole is extracted.

Using the same reaction conditions and techniques, when o-hydroxythioanisole is reacted with β-hydroxymethyl chloride, β-hydroxypropyl chloride or β-hydroxybutyl chloride, there is obtained o-(β-hydroxymethoxy)-thiaoanisole, o-(β-hydroxypropoxy)-thioanisole and o-(β-hydroxybutoxy)-thioanisole, respectively.

B. cis-5-Fluoro-3-(2''-methoxyethyl)-1-(3'-β-hydroxyethoxy-4'-methylsulfinylbenzylidene)-indene The product of Example 5A is reacted by the methods of Examples 3B, 3C, 4A and 4B to obtain cis-5-fluoro-3-(2''-methoxyethyl)-1-(3'-β-hydroxyethoxy-4'-methylsulfinylbenzylidene)-indene.

In this manner the other thioanisoles of Example 5A may be reacted to form the corresponding methoxyethylindenes.

EXAMPLE 6 cis-5-Fluoro-3-(2''-methoxyethyl)-1-(3'-β-chloroethoxy-4'-methylsulfinylbenzylidene)-indene The Examples 5A and 5B are repeated and then the crude product (0.1 mole) is refluxed in excess thionyl chloride and evaporated to dryness to yield the title compound.

In a like manner, other (3'-β-hydroxyethoxy-4'-methylsulfinylbenzylidene)-indenes may be refluxed with other thionyl halides to yield the appropriate (3'-β-haloalkoxy-4'-methylsulfinylbenzylidene)-indenes; for example, (3'-β-bromoethoxy), (3'-chloropropoxy), or (3'-β-bromobutoxy).

EXAMPLE 7

A. o-Ethoxythioanisole o-Chlorothioanisole (prepared by the procedure of Example 3A)(15.85 g., 0.1 mole) is stirred at reflux in nitrobenzene containing copper powder (100 mg.) and sodium ethoxide (6.8 g., 0.1 mole) for 2 hours. The product is steam distilled and the distillate dried and fractionally distilled under reduced pressure to yield o-ethoxythioanisole.

Using the same reaction conditions and techniques, when o-chlorothioanisole is reacted with o-methoxythioanisole, methoxide, sodium propoxide and sodium t-butoxide, there are obtained o-methoxythioanissole, o-propoxythioanisole and o-t-butoxythioanisole, respectively.

B. cis-5-Fluoro-3-(2''-methoxyethyl)-1-(3'-ethoxy-4'-methylsulfinylbenzylidene)-indene The product of Example 7A is reacted by the methods of Examples 3B, 3C, 4A and 4B to obtain cis-5-fluoro-3-(2''-methoxyethyl)-1-(3'-ethoxy-4'-methylsulfinylbenzylidene)-indene.

In this manner the other thioanisoles of Example 7A may be reacted to form the corresponding methoxyethylindenes.

What is claimed is:

1. A method of treating pain, fever and inflammation which comprises administering to a host a therapeutically effective amount of 5-fluoro-2-methyl-1-(p-methylsulfinylbenzylidene)-3-indenyl-β-ethanol.

2. A pharmaceutical composition for treating pain, fever and inflammation comprising a pharmaceutically acceptable carrier and an effective amount of 5-fluoro-2-methyl-1-(p-methylsulfinylbenzylidene)-3-indenyl-β-ethanol.

* * * * *